United States Patent [19]

Pignocco et al.

[11] 4,117,868

[45] Oct. 3, 1978

[54] REFRACTORY LINED CYLINDRICAL ARTICLE

[75] Inventors: Arthur J. Pignocco, Franklin Township, Westmoreland County; Robert H. Kachik, Washington Township, Westmoreland County, both of Pa.

[73] Assignee: United States Steel Corporation, Pittsburgh, Pa.

[21] Appl. No.: 793,021

[22] Filed: May 2, 1977

Related U.S. Application Data

[60] Division of Ser. No. 549,630, Feb. 13, 1975, Pat. No. 4,048,352, which is a continuation-in-part of Ser. No. 332,972, Feb. 15, 1973, abandoned.

[51] Int. Cl.² ............................................. F16L 9/14
[52] U.S. Cl. .................................... 138/146; 138/145; 138/143; 138/141; 138/140; 138/177; 427/234; 427/419 A; 428/472; 428/36
[58] Field of Search ............... 427/181, 190, 191, 192, 427/226, 229, 234, 239, 240, 241, 405, 419 A; 164/92, 97, 98, DIG. 12; 149/2; 102/90; 110/182.5; 75/27; 44/3 R, 3 B; 428/472, 36; 138/141, 145, 140, 143, 146, 177

[56] References Cited

U.S. PATENT DOCUMENTS

| | | | |
|---|---|---|---|
| 1,280,268 | 10/1918 | Merten | 427/181 X |
| 1,796,819 | 3/1931 | Adams | 427/240 |
| 1,817,888 | 8/1931 | Lowe | 427/192 X |
| 2,011,955 | 8/1935 | Touceda | 164/114 X |
| 2,515,191 | 7/1950 | Carpenter et al. | 164/108 X |
| 2,623,809 | 12/1952 | Myers | 427/234 X |
| 2,809,407 | 10/1957 | Thomson et al. | 164/98 X |
| 2,870,498 | 1/1959 | Rejdak | 75/27 X |
| 3,050,409 | 8/1962 | Bayer | 75/27 X |
| 3,136,013 | 6/1964 | Funk et al. | 164/DIG. 12 |
| 3,203,785 | 8/1965 | Knuppel | 266/281 X |
| 3,262,163 | 7/1966 | Gelfand | 164/DIG. 12 |
| 3,396,776 | 8/1968 | Funk | 164/92 X |
| 3,638,978 | 2/1972 | Guntermann | 164/12 X |
| 3,744,369 | 7/1973 | Marziano et al. | 102/90 X |
| 3,830,173 | 8/1974 | Hubble et al. | 138/146 X |
| 3,871,875 | 3/1975 | Yokota | 75/27 |

*Primary Examiner*—Shrive P. Beck
*Attorney, Agent, or Firm*—Forest C. Sexton

[57] ABSTRACT

A refractory lined cylinder or tube is produced by causing an aluminothermic reduction reaction therein, such that the metallic reaction product forms a layer within the cylinder and the slag reaction product forms a second layer overlying the first layer thereby presenting an abrasion-resistant refractory lining.

5 Claims, 4 Drawing Figures

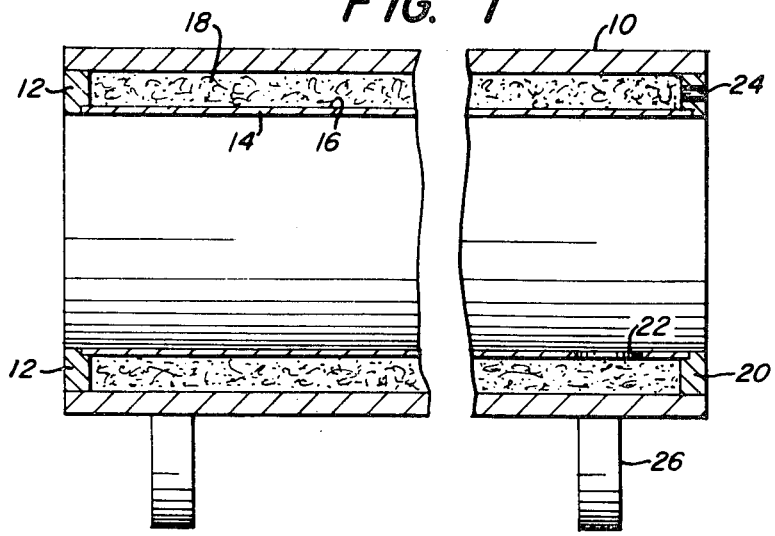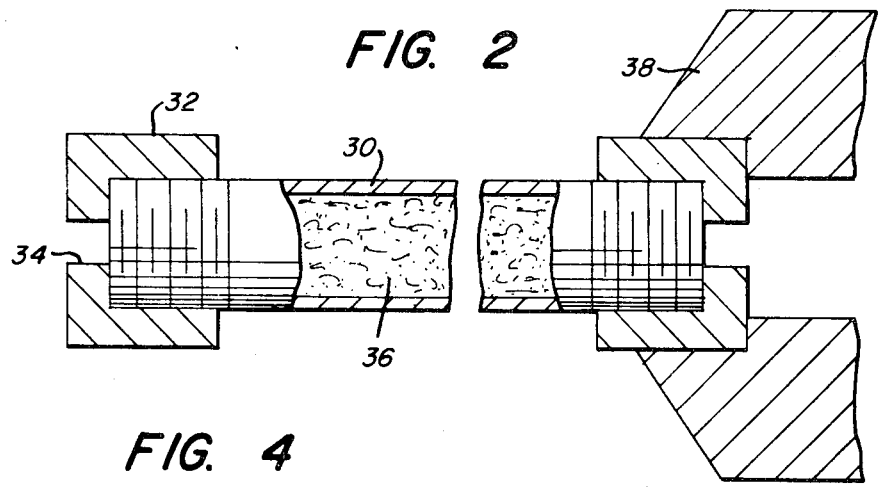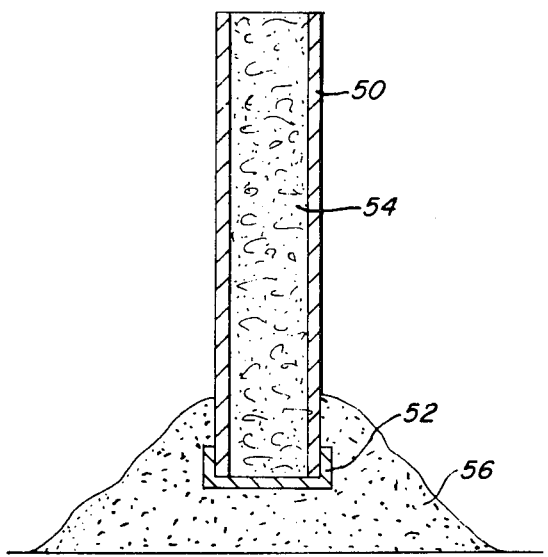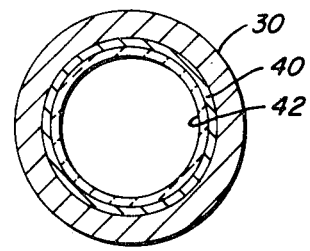

REFRACTORY LINED CYLINDRICAL ARTICLE

CROSS-REFERENCE TO RELATED APPLICATIONS

This application is a division of application Ser. No. 549,630, filed Feb. 13, 1975, now U.S. Pat. No. 4,048,352, which was a continuation-in-part of application Serial No. 332,972, filed Feb. 15, 1973, now abandoned.

BACKGROUND OF THE INVENTION

This invention relates in general to refractory-lined tubes, pipes or cylinders, and more particularly to a method for producing a refractory-lined cylinder by an exothermic reduction reaction, such as aluminothermic reduction.

Tubes, pipes, cylinders, and tanks lined with acid-resistant, corrosion-resistant or abrasion-resistant materials intimately bonded to the metal shell are required in many industrial applications. The shells of some tanks used in the oil industry, for example, are protected by a cured mixture of furnace cement and sand containing short asbestos fibers. The interiors of steel pipes and tanks exposed to corrosive water, salt solutions, or oils containing sulfur compounds are also often coated with cement to inhibit the attack on the steel. In cases where tanks are not subjected to high abrasive wear, but still require protection from an agressive environment, expensive stainless steels are often used in place of carbon steel.

In other applications, glass lined vessels and pipes are used despite their obvious disadvantages and limitations. Thin impervious linings for steel vessels are also obtained through the used of vitreous enamels. This material is essentially a borosilicate glass containing fluorides which is finely ground, suspended in water or an organic solvent, and applied to the surface of the steel by dipping or spraying. The assembly is then dried by warming and finally heated in a furnace to near 1600° F. to melt the enamel so that the particles flow together to form a continuous coat. The operation is often repeated to obtain a sufficiently thick coat. In addition to the complicated and tedious procedure, the substrate steel must be carefully cleaned by degreasing and pickling to assure satisfactory bonding. These treatments are costly and time consuming.

In steelmaking operations, tuyeres and lances are lined with high alumina or mullite linings, which are held in place by refractory cement, to reduce damage from abrasion. The linings are expensive and subject to breakage prior to and during installation in the tuyeres.

We are aware of the following prior art concerning aluminothermic welding processes and centrifugal casting: Adams U.S. Pat. No. 1,796,819, Touceda U.S. Pat. No. 2,011,955, Carpenter et al U.S. Pat. No. 2,515,191.

SUMMARY OF THE INVENTION

It is the primary object of this invention to provide a single, rapid, and effective method for coating the inside of cylinders, pipes, or tanks with an abrasion-resistant, corrosion-resistant, and oxidation-resistant layer of refractory.

It is also an object to provide a method for fusing such a refractory layer to metal cylinders.

It is a further object of this invention to deposit such a refractory without cleaning, pickling, or otherwise conditioning the inside surface of the cylinder.

It is also an object of this invention to provide a coating method which will require relatively little capital expenditure for a coating facility.

It is another object to provide a method by which a wide range of coating thicknesses can be applied to pipes, cylinders, and tanks in a single operation, eliminating the need for several applications to obtain any required coating thickness.

Another object of this invention is to provide a method for depositing a ceramic layer in a cylinder using relatively low cost materials and one which requires no furnace firing or baking to fuse the ceramic particles into a continuous impervious coating.

It is also an object to provide a method of making a refractory-lined tuyere.

It is another object to provide a refractory-lined tubular article, such as a tube, pipe, tuyere or cylinder.

These and other objects of our invention will become apparent from the following detailed specification and the appended drawing in which:

BRIEF DESCRIPTION OF THE DRAWINGS

FIG. 1 is a cross-section of the apparatus required for coating large diameter metal tanks or cylinders in accordance with our invention.

FIG. 2 is a cross-section of the apparatus required to produce an interior refractory coating on small diameter tanks, tubes, tuyeres, or pipes.

FIG. 3 is a cross-section of a tube lined with refractory by the invented process.

FIG. 4 is a cross-section of apparatus for refractory-lining a tube by an alternative method.

DESCRIPTION OF THE PREFERRED EMBODIMENTS

The preferred embodiment of this invention consists of filling a metal tube with an exothermic reduction reaction mixture such as an aluminothermic reduction (ATR) mixture rapidly rotating the filled tube about its longitudinal axis, initiating the ATR reaction, and continuing to rotate the tube until the reaction products have solidified. The centrifugal forces developed effect a separation of a metal phase from a slag phase, propelling the heavier metal phase toward the tube wall where it bonds metallurgically to the metal. The lighter molten slag layer, being displaced toward the center of the pipe by the metal phase, subsequently solidifies to form a continuous layer of refractory. Upon cooling, the metal pipe walls will contract to a greater extent than the ceramic liner, thereby locking the liner into the pipe. The chemical reaction involved in this method includes the very energetic reduction of oxides by such metals as aluminum, magnesium, silicon, and calcium-silicon alloys and mixtures thereof and can be generally represented by:

$$2Al + 3MeO \rightarrow Al_2O_3 + 3Me + \Delta H$$

where $\Delta H$ represents the evolution of a large quantity of heat per mole of reductant (Al). The metal oxide (MeO) should be low in cost, readily available in a dry form and easily reduced by the reductant (Al, Mg, Si, or SiCa) to generate a substantial heat of reaction. Common iron ores, containing magnetite ($Fe_3O_4$) or preferably hematite ($Fe_2O_3$) are well suited for the process, and a stoichiometric mixture of iron ore fines and aluminum is preferred for most applications. In some applications, particularly where the pipe wall is rather thin and in danger of being burned through by the ATR reaction, it is preferable to include a small amount of alumina, typically up to about 20%, to retard the ATR reaction, and thus minimize the risk of burn-through.

The metal oxide preferably has a size at least as fine as −35 mesh, and advantageously is no finer than +200 mesh. The fuel powder should have a size at least as fine as −100 mesh, but no finer than +325 mesh.

As shown in FIG. 1, a metal cylinder or tank 10 is first fitted on one end with a retaining flange 12. An inner sleeve 14 in then positioned in the assembly and the annular space 16 thus formed is filled with an ATR mixture 18. A second retaining flange 20 is then fitted on the open end of the cylinder 10 to contain the charge mixture. Either sleeve 14 or retaining flange 20 or both is provided with holes 22 or 24 to provide access to the charge to initiate the reaction and vent the combustion products. The charged cylinder 10 is then placed on motor driven rolls 26 and the entire assembly rotated about the cylindrical axis at such an angular velocity that the centrifugal force maintains the charge tightly against walls of the cylinder 10. When the cylinder is rotating at the proper speed, the ATR reaction is initiated by igniting the mixture. Centrifugal force, acting on the molten reaction products, separates the metal phase from the slag phase by forcing the heavier, more dense metal phase against the wall of the cylinder. Because the aluminum-iron ore reaction is a very energetic one, the metal phase melts and fuses to the cylinder wall and, in turn, is covered by a layer of molten slag of uniform thickness. The materials quickly solidify, and on cooling to ambient temperature, the slag phase is locked into the cylinder due to the differential thermal contraction of the metal-slag system. When aluminum or magnesium is used as the reductant, a highly refractory, chemically inert, corrosion-resistant and abrasion-resistant alumina or magnesia layer is formed which is useful in many chemical petroleum and steelmaking applications.

Alternatively, the ATR mixture is suspended in an inert vehicle having a suitably low volatility or mixed with a binder to form a thick paste or slurry. Suitable binders include resinates of metals, asphalts, polyvinylchloride ethyl cellulose, plastics and waxes. Retaining flanges 12 and 20 are attached to the ends of cylinder 10 and the inside of the cylinder is coated with the ATR mixture 18 in the paste form. The paste is dried and the coated cylinder can either be stored for future use or used immediately. The coated cylinder is rotated and the mixture is ignited as described above. Upon cooling, an abrasion-resistant refractory-lined cylinder has been produced.

In another alternative, retaining flanges 12 and 20 are attached to the ends of cylinder 10, the assembly is placed on rollers and it is rapidly rotated. When the assembly is rotating at the proper speed, dry ATR mixture 18 is uniformly metered into the cylinder where it falls to the cylinder wall and is held tightly against the wall by centrifugal forces. When a sufficient amount of the mixture has been charged to the inside of the cylinder, the mixture is ignited and the coating process proceeds as described above.

FIG. 2 illustrates the invented method for coating small diameter pipes, tubes, tuyeres, and tanks. Tube 30 is fitted with plugs or retaining flanges 32, each having hole 34 therein, then filled with an ATR mixture 36. The charged assembly is placed into a motor driven chuck 38 and rapidly rotated about its axis. The ATR charge is ignited through hole 34 generating the slag and metal phases as described above. The centrifugal forces generated in the system cause the slag phase to separate from the metal phase thereby forming a continuous slag layer covering the metal. Upon cooling, the reaction products solidify to form a metal coating 40, and an inner refractory coating 42 (FIG. 3) intimately bonded to the inside of the tube 30.

The primary embodiment of this invention, as described above, requires a relatively rapid rotation of the pipe, e.g. at least 1,000 to 2,000 rpm, so that centrifugal forces will separate the metal and slag phases in the molten ATR mixture. As noted, this will cause the metal phase to solidify as an intermediate layer between the original pipe wall and the slag layer. In some applications however, particularly where large diameter pipe is to be coated using a sizable mass of ATR mixture, equally good results can be achieved by using a relatively slow rotation, i.e., slow enough so that centrifugal forces do not hold the ATR mixture against the pipe wall. In this embodiment, the ATR mixture is of sufficient mass that the metal and slag phases are separated by gravity, with the metal phase lying on the bottom pipe inner surface and the slag phase thereover. If the pipe is rotated slowly so that centrifugal forces do not disturb the molten ATR phases, e.g. 100 to 200 rpm, the slag phase will solidify first, being deposited against the original pipe inner surface. That is, as the pipe rotates more slowly, any given point on the pipe inner surface will rotate into and out-of contact with the two molten phases, but always last contacting the slag phase. As the temperature of the two phases begins to drop, the slag will start to solidify against the pipe surface, as surface rotates through the slag layer. In this manner, the slag phase can be substantially completely deposited against the pipe's inner surface before the metal begins to solidify. At this point, the molten metal phase may be poured out of the pipe or rotation continued until the metal phase does solidify, usually as easily removable beads or droplets which do not strongly adhere to the slag layer. By this embodiment then, the pipe is given a slag inner coating without the intermediate metal layer.

EXAMPLES

As an example of our method, a 1¼ inch OD by 4 inches long steel pipe was packed with a stoichiometric mixture of powdered aluminum and hematite iron ore ($Fe_2O_3$) without cleaning or preparing the pipe in any manner. The ends of the pipe were partially closed with pipe reducer sections, thus providing a ¼-inch high lip to contain the molten reaction products. The pipe was then rotated at 1500 RPM. Upon igniting the charge, the ATR reaction rapidly propagated through the charge. When the reaction was complete, and the products had solidified, rotation was stopped and the assembly was allowed to cool to ambient temperature. The pipe was then sectioned to show a fairly uniform and continuous slag layer firmly attached to the inside of the pipe as depicted in FIG. 3.

As another example of our method, 115.7 grams of a mixture consisting of 88.9 grams of nickel oxide sinter, 21.3 grams of 20 mesh aluminum and 5.5 grams of powdered alumina was charged into a length of 1 inch steel pipe. The pipe was not cleaned or prepared in any manner. The pipe was then rotated at a speed of 2250 RPM in a horizontal position, and the ATR reaction initiated. Rotation was continued until the reaction was complete and the reaction products solidified. The resulting ceramic alumina layer was firmly secured inside the pipe.

In still another example, 101.7 grams of a mixture of 71.0 grams of cobalt oxide ($Co_3O_4$), 21.4 grams of 20 mesh aluminum and 9.3 grams of powdered alumina was identically processed in a 1 inch steel pipe as described above for the nickel oxide. Again a secure ceramic alumina coating resulted within the pipe.

We have also found that a small diameter (less than 6 inch) tube can be coated with a refractory-lining by another modification of our method illustrated in FIG. 4. Tube 50 is covered at one end by a cap 52, such as aluminum foil, filled with an ATR charge mixture 54, and placed in a vertical position on a refractory solid or in a granular refractory bed, such as sand bed 56. The sand acts as a receptacle for the reaction products. The cap 52 prevents sand from entering the tube 50 prior to the reaction. The ATR reaction is initiated by igniting the mixture whereupon the extremely violent nature of the reaction throws molten reaction products against the walls of the tube to form a metal-slag layer (commonly termed "skull") on the tube. The skull moves downwardly and into the sand, but coats the tube with a substantially ceramic abrasion-resistant coating containing some metal. The sand bed may have a recess or a receptacle in it to receive the molten skull that leaves the tube. The resulting tube has an intimately bonded single layer lining rather than the two-phase or two-layer lining of the method which includes the rotating step.

Our coating methods can be used on a large variety of metals including, but not limited to nickel, chromium, bronze, brass, iron, steel, stainless steel, copper, cobalt, molybdenum, tin, and aluminum.

It is readily apparent from the foregoing that our invention provides a simple, rapid, and reliable method for coating the inside of cylindrical or tubular articles with a hard, corrosion-resistant, oxidation-resistant, and abrasion-resistant refractory-lining. The method is simple, reliable, relatively inexpensive, and does not require large capital expenditures to practice. Further, the method does not require the careful cleaning or other conditioning or preheating of the metal surfaces, and can be utilized to place a variety of fused refractory coatings onto the inside surfaces of tubes, tuyeres, pipes or tanks in any desired thickness in a single operation.

We claim:

1. A refractory-lined cylinder comprising;
   a metal outer shell,
   a lining deposited in said shell consisting essentially of the reaction product of an exothermic reaction mixture comprising a powdered fuel metal and a reducible metal oxide, said lining consisting of a first layer consisting essentially of a reduced metal phase metallurgically bonded to said shell and
   a second layer overlying said first layer and consisting essentially of an abrasion-resistant refractory metal oxide.

2. A refractory-lined cylinder according to claim 1, wherein said shell is ferrous metal.

3. A refractory-lined cylinder according to claim 1, wherein said second layer is substantially $Al_2O_3$.

4. A refractory-lined cylinder according to claim 3, wherein said metal shell is stainless steel.

5. A refractory-lined cylinder according to claim 4, wherein said first layer is stainless steel.

* * * * *